Aug. 3, 1948.  R. M. NARDONE  2,446,297
STARTER
Filed March 7, 1944  8 Sheets-Sheet 1

Fig. 1.

INVENTOR.
Romeo M. Nardone.
By John A. Robertson.
ATTORNEY

Aug. 3, 1948.　　　　　R. M. NARDONE　　　　　2,446,297
STARTER
Filed March 7, 1944　　　　　　　　　　　　　　8 Sheets-Sheet 2

Inventor
Romeo M. Nardone
By John A. Robertson
ATTORNEY

Aug. 3, 1948.  R. M. NARDONE  2,446,297
STARTER
Filed March 7, 1944  8 Sheets-Sheet 3

INVENTOR.
Romeo M. Nardone.
BY
John A. Robertson
ATTORNEY

Aug. 3, 1948.    R. M. NARDONE    2,446,297
STARTER
Filed March 7, 1944    8 Sheets-Sheet 4

INVENTOR.
Romeo M. Nardone
BY
John A. Robertson
ATTORNEY

Aug. 3, 1948.　　　　R. M. NARDONE　　　　2,446,297
STARTER

Filed March 7, 1944　　　　　　　　　　　　8 Sheets-Sheet 5

INVENTOR.
Romeo M. Nardone.
BY
John A. Robertson
ATTORNEY

Aug. 3, 1948.  R. M. NARDONE  2,446,297
STARTER
Filed March 7, 1944  8 Sheets-Sheet 8

INVENTOR.
Romeo M. Nardone.
BY
John A. Robertson
ATTORNEY

Patented Aug. 3, 1948

2,446,297

UNITED STATES PATENT OFFICE 2,446,297

STARTER

Romeo M. Nardone, Teaneck, N. J., assignor to Bendix Aviation Corporation, Teterboro, N. J., a corporation of Delaware Application March 7, 1944, Serial No. 525,417

16 Claims. (Cl. 290—38)

This invention relates to starters for internal combustion engines and is concerned primarily with the starting of aircraft engines.

In providing a starter of this type, it is now well recognized and accepted practice to employ a friction clutch assembly between the planetary gear mechanism which is driven by the electric motor and the clutch jaw which engages a complemental jaw on the engine crank-shaft.

While a certain range in the torque transmitting properties of the friction clutch device is permissible, conditions of overload are often created and it becomes necessary to accommodate such conditions in the friction clutch mechanism. Accordingly, a highly important object of the present invention is the provision in a starter of this character, of a novel and improved friction clutch assembly.

Every starter of this type embodies as an essential element an electric motor, including a rotatable armature with which is associated the usual commutator. A set of brushes ordinarily engages the commutator. However, when the starter is to be energized by hand, it is necessary that the brushes be lifted to eliminate the resistance of the motor. While various mechanisms have been proposed for the raising and lowering of the brushes, they have not proven satisfactory in every respect and this invention, therefore, has as a further objective the provision of a novel brush lifting mechanism.

In providing a brush lifting mechanism, as above indicated, it is important that the raising and lowering of the brushes be properly co-related with the operation of other mechanisms of the starter, and a further more detailed object is the provision of a starter which includes means for achieving this end.

Various other more detailed objects and advantages such as arise in connection with carrying out the above-noted thoughts in a practical embodiment will in part become apparent, and in part be hereinafter stated as the description of the invention proceeds.

The invention, therefore, comprises a starter for aircraft engines embodying a novel friction clutch, improved brush lifting mechanism, and other devices which are necessary to the proper co-relation of the brush lifting mechanism to other parts of the starter.

For a full and more complete understanding of the invention, reference may be had to the following description and accompanying drawings wherein:

Fig. 4b is a detailed side view partly in section and partly in elevation of one brush and the actuating device associated therewith;

Figure 1:
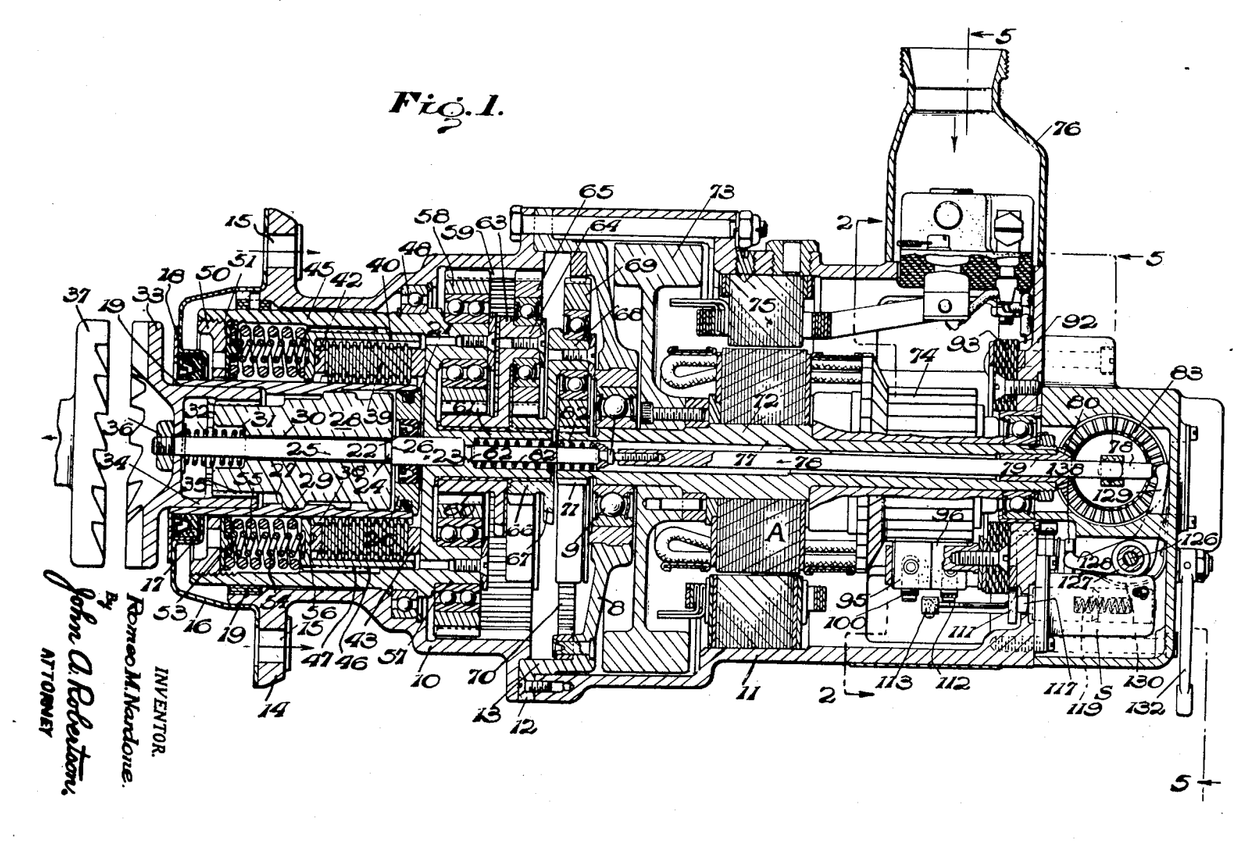
Fig. 1 is a view taken as a section through a starter embodying the improvements of this invention.

Referring now to the drawings, wherein like reference characters denote corresponding parts, and first more particularly to Fig. 1, a starter embodying the improvements of this invention is shown as housed within a casing made of casing sections 10 and 11 between which is clamped the flange 12 of a bearing member 13. It is notable that the casing section 10 is provided with a radially outstanding flange 14 formed with bolt openings 15, whereby it is adapted to be bolted to the casing of the engine with which the starter is to be associated.

Mounted on the open end of the casing section 10 and extending over the flange 14, is an end closure 16 having a central opening as defined by cup-shaped portion 17. Carried by this cup-shaped portion 17 is an oil seal, designated 18, and which is shown more clearly in detail in Fig. 18. This oil seal 18 encompasses a drive sleeve 19 which extends into the casing section 10.

Figures 11, 11A, 11B, 12:
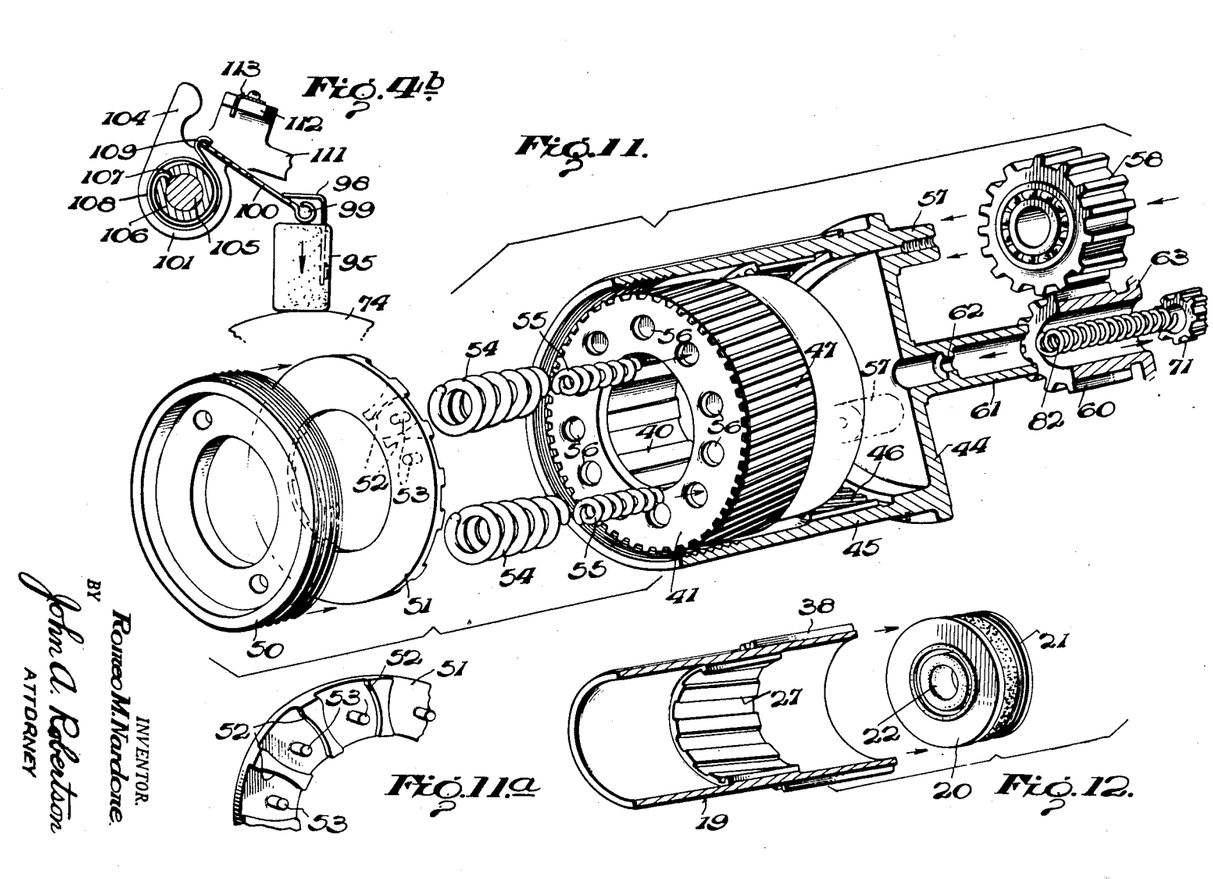
Fig. 11 is a perspective of certain parts of the friction clutch assembly and mechanisms immediately associated therewith in exploded relation.
Fig. 11a is a detailed perspective of one backing member for the springs of the friction clutch assembly.
Fig. 12 is another detailed perspective developing one of the friction clutch elements and the packing therefor in exploded relation.

This drive sleeve 19 is shown in detail in Fig. 12, and it is notable that its inner end carries a packing assembly 20, including an outstanding flange 21 against which the end of the sleeve 19 abuts. This packing assembly 20 also includes an inner seal 22 which encompasses an enlargement 23 on a thrust rod 24. The latter has a forwardly extending part 25 of reduced diameter, there being a shoulder 26 between the enlargement 23 and the part 25.

The inner surface of the drive sleeve 19 is provided with a section of helical splines 27 (see Fig. 12). A jaw actuating member 28 has keys 29 complemental to and interfitting with the splines 27. This member 28 is disposed within the drive sleeve 19 and has a bore 30 receiving the extension 25 of the thrust rod 24. At the free end of the member 28 the bore 30 is enlarged to provide a spring receiving recess 31, which receives one end of an expansion spring 32 that is disposed about the extension 25. The other end of the spring 32 abuts an extensible clutch jaw member or element 33. The latter is formed with a cylindrical extension 34 that extends into the drive sleeve 19. This extension 34 is keyed to the jaw actuating member 28, as indicated at 35. The thrust rod extension 25 passes through an opening in the base of the jaw member 33, and the outer end thereof has screwed thereon a nut 36.

It is evident that as the thrust rod 24 is moved outwardly, that is, to the left speaking with reference to the showing in Fig. 1, the shoulder 26 engages the member 28 and causes a corresponding movement of this jaw actuating member. Thus, the jaw 33 is moved into operative engagement with a complemental jaw 37 carried by the engine crank-shaft. The spring 32 permits of a certain amount of yieldably resisted retraction on the part of the jaw 33 with respect to the member 28 in a manner well known in this art.

The exterior cylindrical surface of the drive sleeve 19 is splined, as shown at 38, Fig. 12. Interfitting with the splines 38 are a plurality of friction disc elements 39 which take the form of rings that are spaced apart to receive therebetween corresponding rings 39 that are splined to a clutch sleeve 40. The sleeve 40 has an inwardly turned end flange 41 (see Fig. 11).

Referring now again to Fig. 1, it is noted that a spacer ring 42 is interposed between the end flange 41 and the clutch pack 39. Likewise, a spacer ring 43 is interposed between the other end of the clutch pack and the end wall 44 of a barrel 45.

Referring particularly to Fig. 11, structure therein shown, and which is shown, described and claimed in a copending divisional application hereof, Serial No. 15,290, filed March 17, 1948, comprises helical splines 46, on the inner surface of the barrel 45, which interfit complemental splines 47 on the exterior of the clutch sleeve 40.

Barrel 45 is mounted for rotation within the casing section 10, being supported at one end by the bearing shown at 48 and at the other by a bearing ring 49. Threaded into the outer end of the barrel 45 is a ring nut 50, and bearing against the nut 50 is a spring positioning ring 51.

As shown more clearly in Fig. 11a, the inner face of this ring 51 is provided with a plurality of recesses 52, the sides of which are defined by arcs and from the center of which outstand pins 53. Received in each of the recesses 52 and positioned thereby is an outer expansion coil spring 54. An inner expansion coil spring 55 is disposed within each outer spring 54 and has one end fitting over a pin 53. The other end of the inner spring 55 fits within one of the recesses 56 formed in the end flange 41 of the clutch sleeve 40. The corresponding end of the outer spring 54 engages this flange 41.

It is evident that an appropriate number of springs 54 and 55 may be employed to exert a required thrust on the clutch sleeve 40, and which thrust is transmitted throughout the spacer ring 42 to the clutch pack 39. However, it is notable that the barrel 45, which is driven by the planetary gearing, as will be later described, may, due to variations in the load encountered, vary the effective force on the clutch pack 39 by reason of the helical splines 46 and the interfitting keys 47. When the torque increases, the helical splines 46 and 47 are rendered effective to relieve the pressure provided by the assembly of springs 54 and 55. Thus, the friction clutch device may be set to have its torque transmitting properties maintained within a certain predetermined range.

Extending inwardly from the end wall 44 of the barrel 45 are a plurality of stub shafts 57. Rotatably carried by each of the stub shafts 57 is a planet gear 58. The inner surface of the casing section 10 at its inner end is formed with gear teeth to provide an internally toothed orbit gear 59.

The planet gears 58 mesh with the orbit gear 59 and also with a sun gear 60. The latter is rotatably mounted on a sleeve-like stub shaft 61 that extends inwardly from the end wall 44. This sleeve-like shaft 61 is provided with an inwardly extending shoulder 62, for a purpose to be later pointed out. It is notable that the outer or left-hand side of the stub shaft 61 (speaking with reference to the showing in Figs. 1 and 11) receives the enlargement 23 on the shaft 24.

Operatively connected to the sun gear 60, as by being integral therewith, is a planetary gear carrier 63. Projecting from the carrier 63 are a plurality of stub shafts 64. Rotatably carried on each of the stub shafts 64 is a planet pinion 65 which meshes with the orbit gear 59, and another sun gear 66. The latter rotates on the sleeve-like shaft 61 and also carries a planet gear carrier 67. Carrier 67 has stub shafts 68, each of which rotatably carries a planet gear 69.

These planet gears 69 mesh with an internally toothed orbit gear annulus 70 that is carried by the bearing section 13. These planets 69 also mesh with a pinion 71 formed on one end of an armature shaft 72.

It is notable that the bearing section 13 has an inwardly extending web 8 which carries a bearing assembly 9 that supports the inner end of the armature shaft 72.

Figures 16, 17, 18:
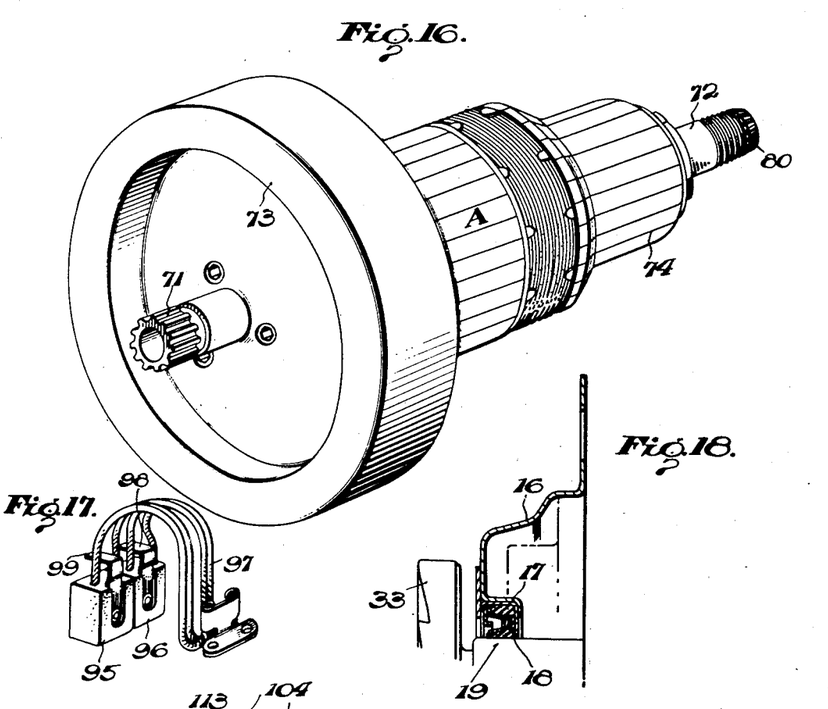
Fig. 16 is a detailed perspective of the unit comprising the flywheel and motor armature.
Fig. 17 is another detailed perspective of the brushes and the electrical connections leading thereto.
Fig. 18 is a detailed section through an oil seal employed at the end adjacent the clutch jaw.

Drivably carried by the armature shaft 72 is a flywheel or inertia member 73. As shown in Fig. 16, the flywheel 73, the armature shaft 72, and pinion 71, together with the various electrical components of the armature, are a single unit which rotate together. This armature is referred to in its entirety by the reference character A, and at one end includes a commutator 74.

The field windings of the motor are shown at 75 and are electrically connected to appropriate binding posts located in the wire outlet 76 that is carried by the casing section 11.

The thrust rod 24 has a reduced portion at the shoulder 62 and extends past this shoulder through the sleeve 61 into the bore 77 of the armature shaft 72. Within the bore 77 it is connected to another thrust rod 78 that extends out past the end of the armature shaft, being slidable in a sleeve 79 that has formed on its free end a bevel gear 80.

The connection between the thrust rods 24 and 78, which is depicted at 81, provides an abutment for one end of an expansion spring 82. This spring 82 encompasses the rod 24 and at its other end bears against the shoulder 62. The tendency of the spring 82 is, of course, to retract the thrust rod 24 and clutch jaw member 33 carried thereby.

Figures 5, 6:
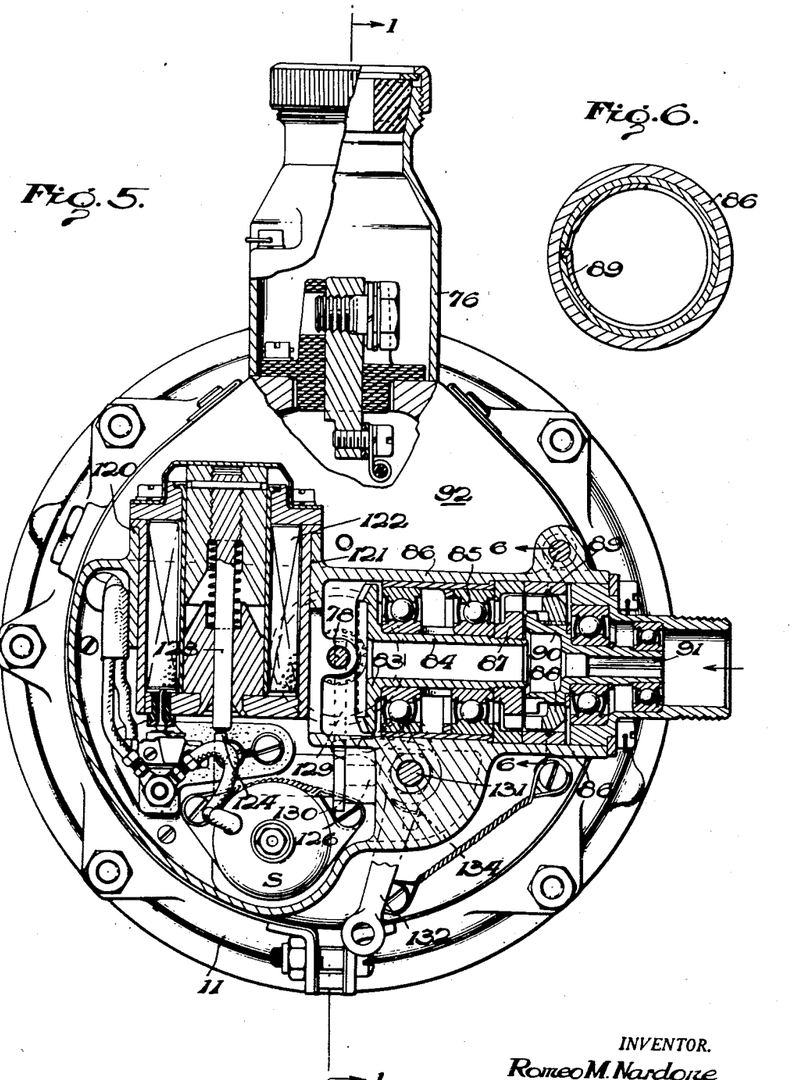
Fig. 5 is another sectional showing taken about on the planes represented by the lines 5—5 of Fig. 1.
Fig. 6 is a detailed section taken about on the plane represented by the line 6—6 of Fig. 5.

Meshing with the bevel pinion 80 is a complemental bevel gear 83. Referring now more particularly to Fig. 5, the bevel gear 83 is shown as being drivably mounted on a sleeve-like shaft 84 which is journaled in bearings 85 carried by a supporting structure 86. The outer end of the shaft 84 drivably carries a jaw element 87 of a clutch. A complemental extensible jaw element 88 is adapted to interlock with the jaw element 87.

Upon rotation in one direction, this jaw element 88 frictionally engages a non-rotative lock ring 89 carried by the supporting structure 86 and has an inner spiral key or thread engaging a complemental spline on a bell-shaped connecting member 90. Thus, when the member 90 is turned in one direction, the spiral key construction is rendered effective, due to the frictional engagement of the ring 89, to move the jaw member 88 into mesh with the jaw 87.

As the jaw 88 first positively locks with the jaw 87, the friction, imposed on the jaw 88 by the ring 89, is released by the arrival radially opposite the ring, of a chamfer or ramp, indicated at the right of the ring 89 in Figure 5, so that, by reason of the lock, meshing of the jaws is completed without the friction of the ring.

The teeth of the jaw member 88 are beveled so that when the relative rotation is in a reverse direction, the jaws will disengage, and the ramp or chamfer will guide the ring 89 back into frictional engagement with the jaw 88. The bell-shaped member 90 includes a non-circular socket 91 which is adapted to receive one end of a flexible driving cable. Thus, when a cable is so applied and rotated, the member 90 is first turned to move the jaws into meshing engagement after which the sleeve shaft 84 is driven to turn the bevel gear 83 and through the bevel pinion 80 thus drive the armature shaft 72.

When the starter is so hand energized, it is important that the electric motor offer no resistance, hence the brushes thereof are lifted in a manner now to be described.

The casing section 11 is formed with a wall or partition member 92, which, at the upper side of the casing constitutes an end wall and at the lower part acts as a partition to mark off an end housing which encloses the hand energizing means above described. The inner face of this partition 92 carries a ring 93 of insulating material on which the brushes are mounted.

Figures 2, 3, 4, 4A:
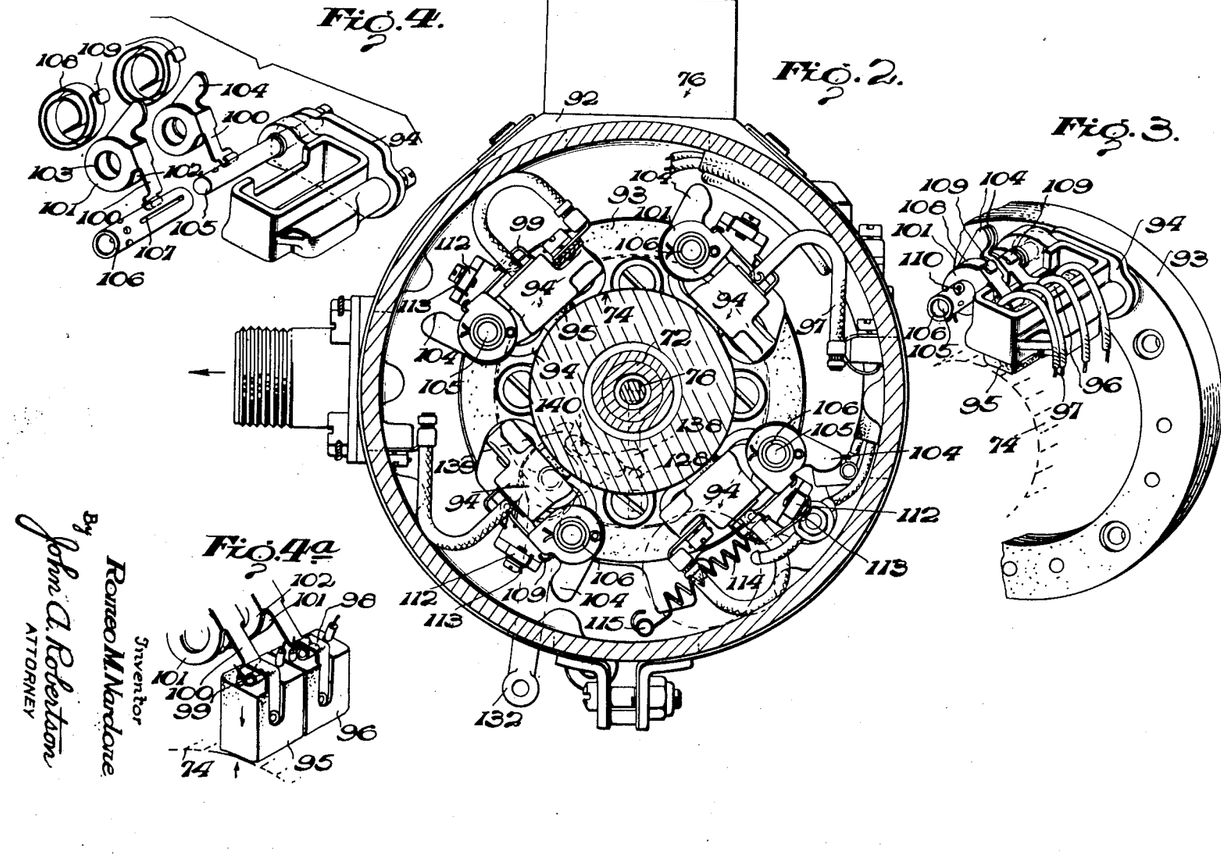
Fig. 2 is a sectional view taken normal to the plane of Fig. 1, this view is taken about on the planes represented by the line 2—2 of Fig. 1.
Fig. 3 is a detailed perspective developing the mounting of the brush lifting mechanism.
Fig. 4 is a perspective view bringing out the several elements of the brush holder and brush actuating means immediately associated therewith in exploded relation.
Fig. 4a is another detailed perspective of a pair of brushes and the mode of operatively connecting the brush actuating springs thereto.

In the embodiment of the invention illustrated in the drawings, four sets of brushes are employed. Obviously, this number is intended as no limitation on the invention, as the number may be varied as the occasion demands. Inasmuch as each pair of brushes is mounted on the ring 13 in the same manner and actuated in the same way, it is deemed necessary to here describe only one such arrangement. Referring now to Fig. 3 it will be noted that extending inwardly from the free face of the ring 93 is a bracket 94 which houses a pair of brushes 95 and 96. At the lower end these brushes engage the commutator 74 when they are in their lower position. The wires shown at 97 (see also Fig. 17) connects the brushes to the wire outlet at 76.

As shown more clearly in each of Figs. 4a, 4b and 17, each of the brushes 95 and 96 is provided with an L-shaped lifting piece 98. Each of these pieces 98 has a top flange that is spaced from the top of the brush and beneath which is positioned the rolled end 99 of a brush actuating member 100.

Upon referring to Fig. 4, it will be noted that this member 100 takes the form of an arm that outstands from each of a pair of ring-like members 101 and 102, which are formed with concentric openings 103. Outstanding from the ring 102 is an ear 104, for a purpose to be later described.

Carried by the insulation 93, as by being secured to the bracket 94, is a shaft 105. Disposed over the shaft 105 is a sleeve 106 that is slotted as shown at 107. The aligned openings 103 receive this sleeve 106, and a spiral spring 108 is positioned about the sleeve 107 between each pair of rings 101 and 102. The inner end of the spring 108 is received in the slot 107, while the outer end is turned over, as indicated at 109, to provide a U-shaped hook which engages the end of the arm between the rings 101 and 102. In order to provide for variations in the tension of the spring 108, the sleeve 106 is rotatable on the shaft 105, and due to the positioning of the end of the spring in the slot 107, the tension may be adjusted as required.

A cotter pin shown as 110 in Fig. 3 serves to maintain an adjusted position of the sleeve 106 with respect to the shaft 105. It is evident that the spring 108 affects the brush actuating member 100 so as to urge the brushes 95 and 96 into engagement with the commutator 74, that is, when the brushes are in their lower position. However, should the entire piece comprising the parts 100, 101, 102, 103 and 104, be pivoted in a counterclockwise direction, in a manner to be described, the brushes will be raised due to the rolled ends 99 engaging the upper end of the L-shaped members 98.

The wall 92 back of the insulation 93, is thickened to provide a bearing for a brush ring 111. This brush ring is shown in detail in Fig. 19 and carries an inwardly extending arm 112 for each pair of brushes. The free end of each arm 112 may be covered by insulation 113, and is adapted to engage the ears 104 for each pair of brushes. Thus, as the ring 111 is rotated in a counterclockwise direction, speaking with reference to the showing of Fig. 2, the brush actuating members 100 are effected to raise the brushes.

Figure 19:
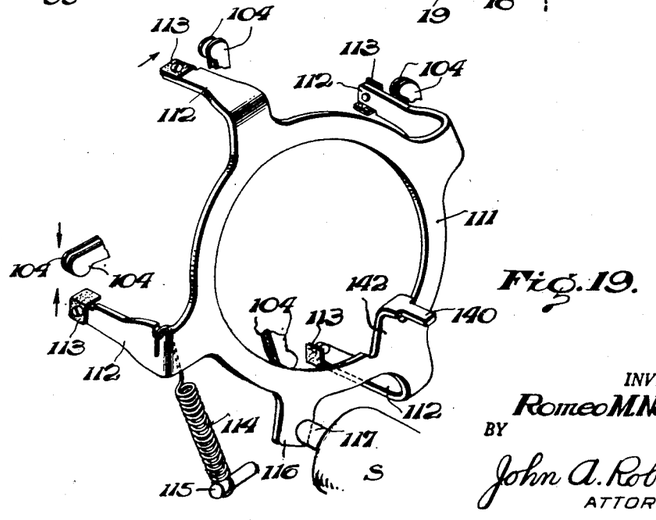
Fig. 19 is a detailed perspective of the brush actuating ring.

A spring 114 has one end anchored to one of the arms 112, as shown in Figs. 2 and 19, and its other end is secured to the wall 92, as indicated at 115. This spring is under tension and serves to urge the ring 111 in a clockwise direction, speaking with reference to the showing of Fig. 2. Thus, under normal conditions, the spring 114 tends to maintain the brushes in their lowered position.

Radially outstanding from the ring 111 is a lug 116 which is adapted to be engaged by the free end of a plunger 117, which is the moving part of a solenoid referred to in its entirety by the reference character S. This solenoid is shown more particularly in Fig. 14, and includes windings 118 that are connected by appropriate wiring to the wire outlet at 76. An expansion spring, shown at 119, normally urges the plunger 117 outwardly into a position in which it engages the lug 116 to hold the brushes upraised, but when the windings 118 are energized the plunger 117 is retracted against the influence of the spring 119 and the ring 111 is affected by spring 114 to lower the brushes into commutator engaging position.

The housing structure back of the partition 92 includes a top wall 120 (see Fig. 7), which at one side is formed with an opening 121 into which is fitted a solenoid 122. This solenoid 122 is referred to as the meshing solenoid because, under certain conditions, it causes meshing of the jaw 33. The solenoid 122 may be of a well known construction, including a plunger 123, which is effected upon energizing of the windings of the solenoid to be moved downwardly, speaking with reference to the showing of Fig. 7. Upon such downward movement the ends of the plunger 123 engage an arm 124 that is carried by a sleeve 125 that is journaled on a shaft 126 that is carried by the housing.

A bell crank 127 is drivably carried by the inner end of the sleeve 125. This bell crank includes two arms 128 and 129. The free end of the arm 129 engages the end of the thrust rod 78 so that upon downward movement of the arm 124, the sleeve 125 is rotated to move the thrust rod 78 forwardly, that is, to the left speaking with reference to the showing of Fig. 1. A leaf spring 130 has one end anchored to the end wall of the housing, and its forward end engages beneath the arm 128 to normally maintain the end 129 in a retracted position.

A shaft 131 is journaled in the end housing and extends in a direction substantially parallel to the thrust rod 78. One end of the shaft 131 projects through the end wall of the housing and the projecting portion has affixed thereto one end of a hand operating lever 132. This lever 132 may be availed of to manually rotate the shaft 131 when it becomes desirable to adapt the starter for hand energizing.

Figure 7:
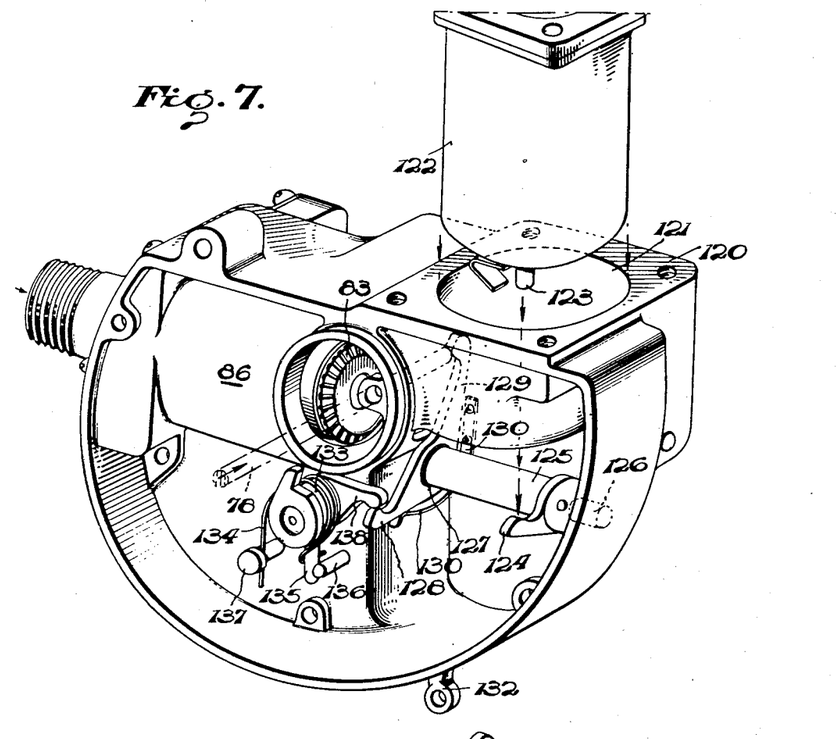
Fig. 7 is a detailed perspective of a portion of the starter developing more particularly certain of the devices for causing movement of the clutch jaw into meshing position.
Figure 8:
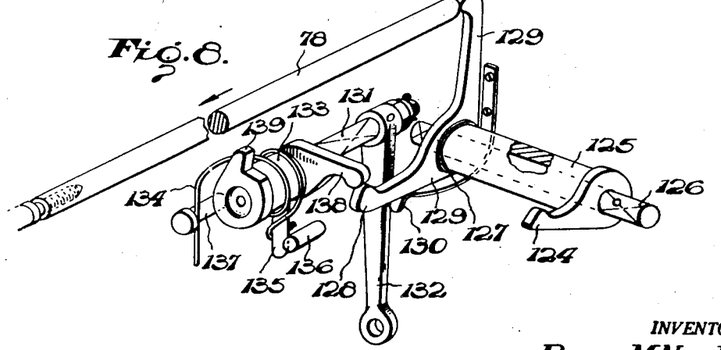
Fig. 8 is another similar perspective with the casing and supporting structure removed.
Figure 9:
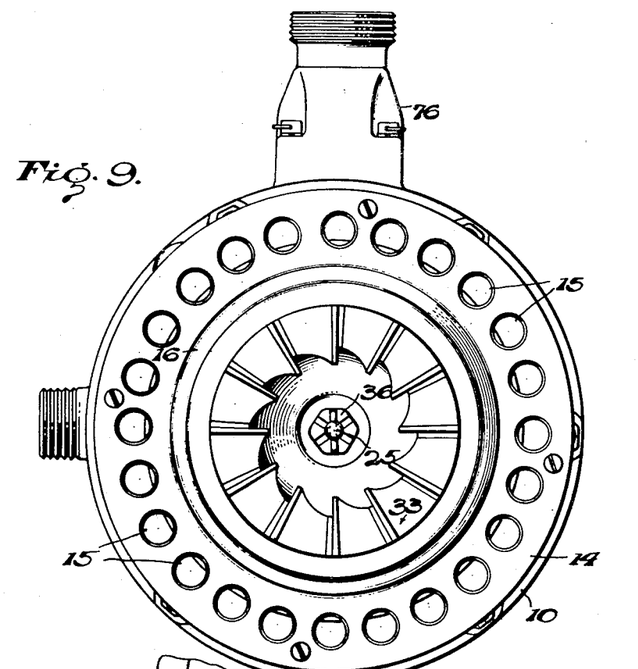
Fig. 9 is an end elevation of the end carrying the clutch jaw.

Drivably mounted on the shaft 131 is a sleeve 133 and with which sleeve is associated a spring 134 that normally exerts a tendency to rotate the sleeve in a counterclockwise direction, that is, speaking with reference to the showing of Fig. 8. This sleeve 133 carries an arm 135 that abuts a stop 136 to limit movement in this direction. The same arm 135 may engage another stop 137 to limit movement in the opposite direction. Outstanding from the sleeve 133 is another arm 138 that is in operative engagement with the end of the arm 128, as shown in Figs. 7 and 8.

The inner end of the sleeve 133 is also formed with an upstanding lug 139 that is adapted to operatively engage a projection 140 that extends through an arcuate slot 141 (see Fig. 15) formed in the wall 92, and which extension is carried by a radial arm 142 of the ring 111.

When the hand lever 132 is rotated in a clockwise direction, speaking with reference to the showing of Fig. 8, two things occur: the arm 138 is moved downwardly and, due to its engagement with the arm 128, the bell crank 127 is operated to move the thrust rod 78 forwardly. At the same time the lug 139 engages the extension 140 and moves the ring 111 in a clockwise direction, speaking with reference to the showing of Figs. 15 and 19.

This movement of the ring 111 causes the lug 116 to clear the end of the plunger 117, whereby the latter, under the influence of the spring 119, moves outwardly into a position into which it engages a side of the lug 116 and prevents return movement of the ring 111. However, the movement of the ring 111, which is clockwise with respect to the showing of Fig. 19 and counterclockwise with respect to the showing of Fig. 2, causes the arms 112 to engage the ears 104 on the brush actuating members and thus lift the brushes into a raised position in which they are maintained.

While the operation of the above-described mechanism is believed to be readily ascertainable from the matter set forth, the two methods of using the starter are outlined as follows:

Assume that a source of current is available, and the hand energizing means is not to be used. If the brushes should happen to have been left in their lowered position, depending upon the previous method of utilizing the starter, the plunger 117 of the solenoid S will be in a retracted position. However, should the brushes be in a raised position, starting of the motor into operation will energize the windings 118 and the plunger 117 will thus be retracted against the influence of the spring 119. The spring 114 will then be effective to actuate the ring 111 and lower the brushes.

At the same time, if desired, the solenoid 122 will be energized to cause downward movement of the plunger 123. This, through the arm 124, sleeve 125 and bell crank 127, will move the thrust rod 78 forwardly to mesh the jaws 33 and 37.

Figure 10:
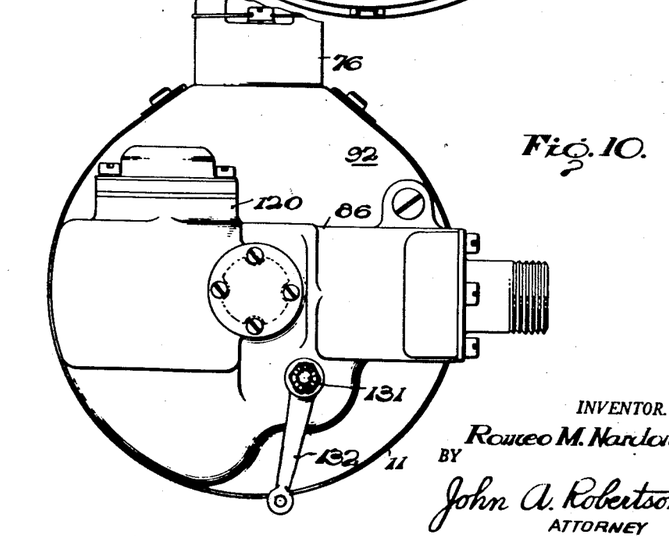
Fig. 10 is an end elevation of the opposite end.

Should it be desirable to employ hand energizing, the lever 132 is moved in a counterclockwise direction, speaking with reference to the showing of Fig. 10, or clockwise with respect to the showing of Fig. 8. This causes the brushes to be raised in the manner above described, and also causes forward movement of the thrust rod 78 to engage the jaws 33 and 37. After the brushes have once been raised, they will be locked in this position due to engagement of the plunger 117 with the lug 116. If the lever 132 is now released, the spring 82 will affect the thrust rod 78 to permit release of the clutch jaws 33 and 37.

An end of a flexible driving cable may now be applied to the socket 91, and as the flexible cable is manually driven, the flywheel 73 will be rotated to build up a proper speed. When this speed has been obtained, the lever 132 may again be availed of to mesh the jaws 33 and 37.

Figures 13, 14, 15:
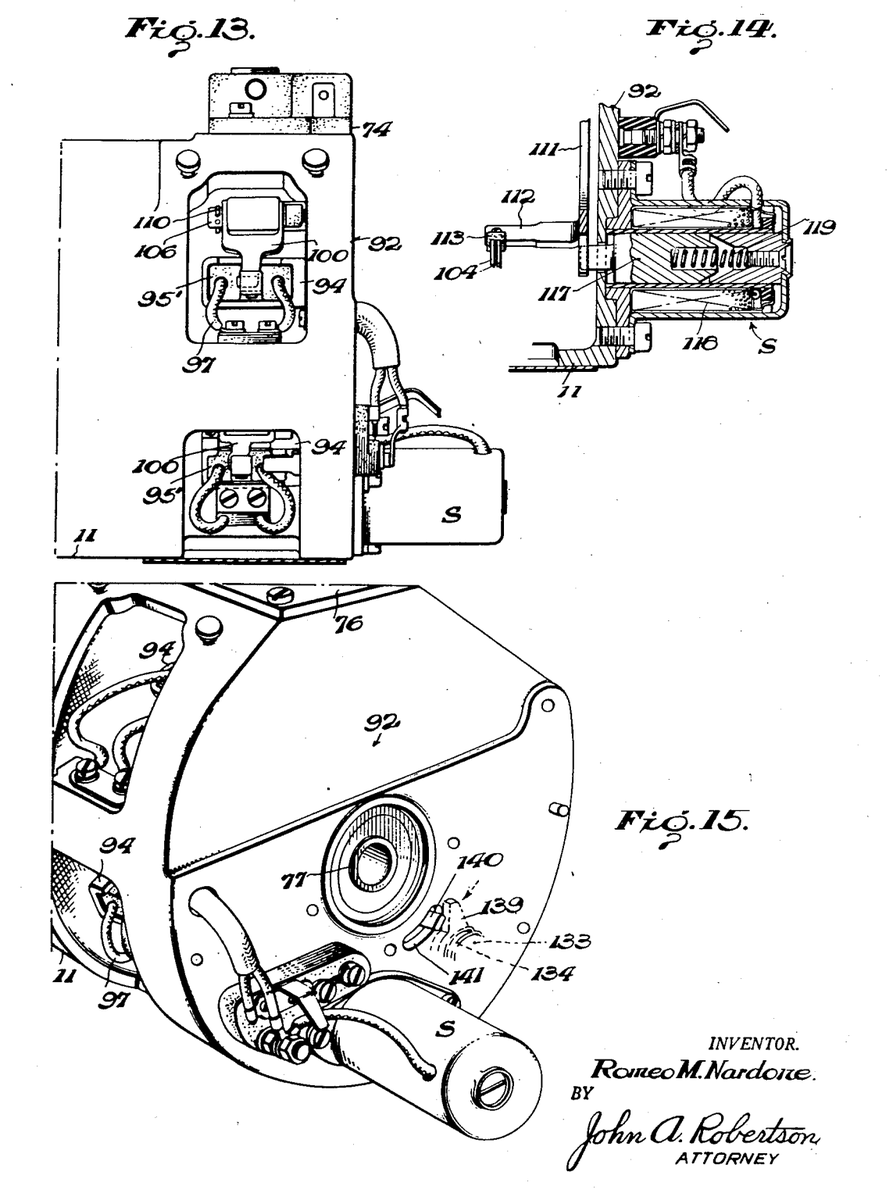
Fig. 13 is a side view showing a modified form of brush assembly.
Fig. 14 is a detailed view taken as a section through the solenoid which controls the position of the brushes.
Fig. 15 is a perspective of that portion of the casing which houses the brushes and brush lifting mechanism.

Fig. 13 discloses a somewhat modified form of brush assembly in which a single brush is employed in lieu of each pair of brushes 95 and 96. The adaptation of the brush actuating means described above to this single brush set up is believed to be obvious. It simply means that a single assembly of the parts 100, 101, 102, 103 and 104, together with the spring 108, will be employed rather than the duplicate construction above described.

Although several embodiments of the invention have been illustrated and described, various changes in the form and relative arrangements of the elements may be effected to suit requirements.

What is claimed is:

1. In an aircraft engine starter, a clutch jaw adapted to mesh with a complemental jaw on an engine to be started, a thrust rod for moving said jaw into meshing engagement, an electric motor for driving said jaw and including a commutator having brushes associated therewith, a brush lifter operatively associated with each brush, a ring adapted to engage said brush lifters to raise the brushes, a detent on said ring, a solenoid including a spring actuated plunger adapted to cooperate with said detent to hold said ring in brush raised position, means for simultaneously energizing said motor and solenoid, and mechanism for actuating said ring and at the same time moving said thrust rod to mesh said jaw.

2. In an aircraft engine starter, a clutch jaw adapted to mesh with a complemental jaw on an engine to be started, means for moving said jaw into meshing position, an electric motor including a commutator having brushes associated therewith, a brush lifter associated with each brush and including a pivoted abutment member, a rotatable brush actuating ring having arms each of which is adapted to engage one of said abutment members, a detent on said ring, locking means associated with said detent for holding said ring in brush raised position, a projection carried by said ring, and an operating mechanism including a member adapted to engage said jaw meshing means and another member to engage said projection whereby said brushes are raised simultaneously with meshing of said jaw.

3. In an aircraft engine starter, a jaw, a rod adapted to thrust the jaw into clutching engagement with an engine clutch element, a jaw driving motor including rotatable contact means and brushes associated with the rotatable means, brush lifting mechanism comprising a rotatable ring, a pivoted brush lifter having an abutment member, an arm outstanding from one face of said ring in a direction substantially normal thereto and adapted to engage said abutment to operate said brush lifter, spring means normally tending to rotate said ring in a direction causing said brush lifter to lower the brush associated therewith, said ring being provided with a detent, locking means associated with said detent, and means for rotating said ring in opposition to the tendency of said spring.

4. In an aircraft engine starter, a jaw, a rod adapted to thrust the jaw into clutching engagement with an engine clutch element, a jaw driving motor including rotatable contact means and brushes associated with the rotatable means, brush lifting mechanism comprising a rotatable ring, a pivoted brush lifter having an abutment member, an arm outstanding from one face of said ring in a direction substantially normal thereto and adapted to engage said abutment to operate said brush lifter, spring means normally tending to rotate said ring in a direction causing said brush lifter to lower the brush associated therewith, said ring being provided with a detent, locking means associated with said detent, a projection extending outwardly from said ring in a direction opposite to the direction of said arm, and operating mechanism adapted to engage said extension to rotate said ring in opposition to the tendency of said spring.

5. In an aircraft engine starter, a jaw, a rod adapted to thrust the jaw into clutching engagement with an engine clutch element, a jaw driving motor including rotatable contact means and brushes associated with the rotatable means, brush lifting mechanism comprising a rotatable ring, a pivoted brush lifter having an abutment member, an arm outstanding from one face of said ring in a direction substantially normal thereto and adapted to engage said abutment to operate said brush lifter, spring means normally tending to rotate said ring in a direction causing said brush lifter to lower the brush associated therewith, a lug on said ring, a solenoid including a plunger that is spring actuated and which engages said lug to prevent rotation of said ring in the direction caused by said spring when said solenoid is de-energized, said ring being formed with an inwardly extending radial arm, a projection on said arm, and operating mechanism adapted to engage said projection to rotate said ring in opposition of the tendency of said spring.

6. In an aircraft engine starter, a jaw, a rod adapted to thrust the jaw into clutching engagement with an engine clutch element, a jaw driving motor including rotatable contact means and brushes associated with the rotatable means, a brush lifting assembly comprising a lifter for each of said brushes including a flange in spaced relation to the brush top, a pair of brush actuators each including a free end disposed between one of said flanges and brush top, a spiral spring associated with each actuator for urging the brush associated therewith downwardly, means to adjust the tension of said spiral spring, an abutment ear upstanding from each actuator, and a brush ring having an arm adapted to engage said abutment ears to raise the said brushes.

7. In an aircraft engine starter, a jaw, a rod adapted to thrust the jaw into clutching engagement with an engine clutch element, a jaw driving motor including rotatable contact means and brushes associated with the rotatable means, a brush lifting assembly comprising a lifter including a flange in spaced relation to each brush top, a brush actuator including a free end disposed between said flange and brush top, a spiral spring associated with said actuator for urging said brush downwardly, means to adjust the tension of said spiral spring, an abutment ear upstanding from said actuator, and a brush ring having an arm adapted to engage said abutment ear to raise said brush.

8. In an aircraft engine starter, a jaw, a rod adapted to thrust the jaw into clutching engagement with an engine clutch element, a jaw driving motor including rotatable contact means and brushes associated with the rotatable means, a brush lifting assembly comprising a lifter for each of said brushes including a flange in spaced relation to the brush top, a pair of brush actuators each including a free end disposed between one of said flanges and brush top, a spiral spring associated with each actuator for urging the brush associated therewith downwardly, means to adjust the tension of said spiral spring, an abutment ear upstanding from each actuator, a brush ring having an arm adapted to engage said abutment ears to raise the said brushes, means to lock said ring in brush raised position, spring means associated with said ring and normally exerting a tendency to move said ring to brush lowered position, and operating mechanism for turning said ring in opposition to said spring means.

9. In an aircraft engine starter, brush lifting means including an actuating ring adapted to be rotated to control the position of the brushes, jaw meshing means, and mechanism for simultaneously actuating said ring and said jaw meshing means, said mechanism comprising a rotatable sleeve, an arm outstanding from said sleeve, operating connections between said arm and said jaw meshing means, a second arm outstanding from said sleeve, and operating connections between said second arm and said ring.

10. In an aircraft engine starter, brush lifting means including an actuating ring adapted to be rotated to control the position of the brushes, jaw meshing means, and mechanism for simultaneously actuating said ring and said jaw meshing means, said mechanism comprising a shaft, manually operable means for rotating said shaft, a sleeve drivably carried by said shaft and including a pair of radially outstanding arms, operating connections between one of said arms and said jaw meshing means, and operating connections between the other of said arms and said ring.

11. In an aircraft engine starter, brush lifting means including an actuating ring adapted to be rotated to control the position of the brushes, jaw meshing means, and mechanism for simultaneously actuating said ring and said jaw meshing means, said mechanism comprising a sleeve rotatably mounted in said casing, an arm outstanding from said sleeve, operating connections between said arm and said jaw meshing means, said connections including a bell crank, a sleeve shaft drivably carrying said bell crank, an arm outstanding from said sleeve shaft and adapted to be engaged by a solenoid plunger to actuate said bell crank, a second arm outstanding from said sleeve, and operating connections between said second arm and said ring.

12. In an aircraft engine starter, brush lifting means including an actuating ring adapted to be rotated to control the position of the brushes, spring means for urging said ring in one direction, a detent and lock means associated therewith for holding said ring in brush lowered position, jaw meshing means and mechanism for simultaneously actuating said ring and said jaw meshing means, said mechanism comprising a sleeve rotatably mounted in said casing, an arm outstanding from said sleeve, operating connections between said arm and said jaw meshing means, a second arm outstanding from said sleeve, operating connections between said second arm and said ring, stops for limiting the rotation of said sleeve, and a spring associated with said sleeve and stops normally maintaining said sleeve in a predetermined position.

13. In an engine starter having an inertia member and an extensible jaw clutch member, an electric motor for rotating said inertia member, resilient means for urging the brushes of said motor into contact with the motor commutator, manually operable means for retracting said resilient means and extending said jaw clutch member, means for latching said resilient means in retracted positions, solenoid operated means for releasing said latching means, and solenoid operated mechanism for extending said jaw clutch member.

14. In an engine starter having an electric motor and an extensible jaw clutch member adapted to be extended into engagement with a jaw clutch member of an engine for cranking the latter, resilient means for urging the brushes of said motor into contact with the motor commutator, manually operable means for retracting said resilient means, means for latching said resilient means in retracted positions, and solenoid operated means for separately releasing said latching means and extending said extensible jaw clutch member.

15. In an engine starter having an inertia member, an extensible jaw clutch member and an electric motor for rotating said inertia member, the combination of resilient means for urging the brushes of said motor into contact with the motor commutator, manually operable means for retracting said resilient means and extending said jaw clutch member, means for latching said resilient means in retracted positions, a solenoid, and means operated by said solenoid for separately releasing said latching means and extending said jaw clutch member.

16. In an engine starter having an inertia member, an extensible jaw clutch member, an electric motor for rotating said inertia member, and means providing for rotating the inertia member independently of the motor, the combination of means for relieving said means of friction load including resilient means for urging the brushes of the motor into contact with the motor commutator, manually operable means for retracting said resilient means and extending said jaw clutch member, means for latching said resilient means in retracted positions, a solenoid, means operated by the solenoid for separately releasing said latching means and extending said jaw clutch member, a second extensible jaw clutch member which is adapted to be frictionally held against rotative movement for effecting its axial movement in one direction from initial position for engagement with a loaded clutch element to be rotated thereby, and non-rotative ring means frictionally holding said second clutch member against rotation until it engages the load element for resistance by the latter against rotation whereupon the load element holds the second clutch member for the completion of said axial movement and said ring means assumes a position released from holding relation to said second clutch member, said holding means being maintained in said released position during said rotative movement.

ROMEO M. NARDONE.

REFERENCES CITED

The following references are of record in the file of this patent:

UNITED STATES PATENTS

| Number | Name | Date |
| --- | --- | --- |
| 1,184,007 | Norelius | May 23, 1916 |
| 1,760,874 | Lansing | June 3, 1930 |
| 1,892,095 | Chilton | Dec. 27, 1932 |
| 1,892,096 | Chilton | Dec. 27, 1932 |
| 1,900,799 | Chilton | Mar. 7, 1933 |
| 2,054,381 | Lansing | Sept. 15, 1936 |
| 2,156,667 | Nardone | May 2, 1939 |
| 2,261,402 | Nardone | Nov. 4, 1941 |
| 2,295,289 | Nardone | Sept. 8, 1942 |
| 2,319,469 | Nardone | May 18, 1943 |
| 2,324,156 | Heintz et al. | July 13, 1943 |
| 2,346,303 | Heintz | Apr. 11, 1944 |
| 2,349,867 | Heintz | May 30, 1944 |
| 2,353,317 | Nardone | July 11, 1944 |
| 2,377,260 | Nardone | May 9, 1945 |
| 2,381,982 | Nardone | Aug. 14, 1945 |